United States Patent [19]
Ford et al.

[11] Patent Number: 5,963,684
[45] Date of Patent: Oct. 5, 1999

[54] MULTIPLE-WAVELENGTH OPTICAL TRANSCEIVER

[75] Inventors: Joseph Earl Ford, Oakhurst Township, Monmouth County; Thomas Huntington Wood; James Albert Walker, both of Monmouth, all of N.J.

[73] Assignee: Lucent Technologies Inc., Murray Hill, N.J.

[21] Appl. No.: 08/800,732

[22] Filed: Feb. 13, 1997

[51] Int. Cl.[6] ............................................. G02B 6/28
[52] U.S. Cl. ...................... 385/24; 359/11; 359/12; 359/13; 359/15; 359/29; 359/56; 359/569; 359/127; 372/108; 372/703
[58] Field of Search ........................... 359/11, 12, 13, 359/15, 29, 56, 569, 127; 385/24, 31, 37, 39, 147, 11, 14; 372/108, 703

[56] References Cited

U.S. PATENT DOCUMENTS

| | | | |
|---|---|---|---|
| 4,749,247 | 6/1988 | Large | 385/24 |
| 4,763,969 | 8/1988 | Khoe et al. | 385/37 |
| 4,873,697 | 10/1989 | Haeussler et al. | 372/108 |
| 5,555,330 | 9/1996 | Pan et al. | 385/39 |
| 5,757,523 | 5/1998 | Wood et al. | 359/15 |
| 5,786,915 | 7/1998 | Scobey | 359/127 |

OTHER PUBLICATIONS

"Silicon Modulator Based on Mechanically–Active Anti–Reflection Layer with 1 Mbit/sec Capability for Fiber–in–the–Loop Applications" by K. W. Goossen et al; IEEE Photonics Tech. Ltrs, vol. 6, No. 9, Sep. 1994.

"Wavelength–selective planar holograms" by J. E. Ford et al; Optics Letters, vol. 21, No. 1, Jan. 1, 1996.

"Single–substrate birefringent computer–generated holograms" By F. Xu et al; Optics Letters, vol. 21, No. 7, Apr. 1, 1996.

"polarization–selective computer–generated holograms" by J.E. Ford et al; Optics Letters, vol. 18, No. 6, Mar. 15, 1993.

Ford et al. (Wavelength–selective planar holograms) Optics Letters, vol.21, No. 7, Apr. 1996.

Ford et al. (Polarization–selective computer–generated holograms) Optics Letters, vol. 18, No.06 Mar. 1993.

*Primary Examiner*—Akm E. Ullah

[57] ABSTRACT

An optical demultiplexing apparatus is capable of spatially separating a multiplexed optical signal into two or more optical wavelength signals thereof. An input multiplexed optical signal present on a first plane is imaged through a color-selective grating plane to a second plane. The color-selective grating has a nonlinear change of diffraction characteristics as a function of incident wavelength to provide substantial spatial separation in the second plane between bands of wavelengths proximate to the two or more optical wavelength signals. In another embodiment, the apparatus uses a polarization-selective grating to spatially separate a polarization-multiplexed optical signal into two substantial spatially separated optical polarization signals. In other embodiments, the optical apparatus may be used as an optical signal multiplexer, splitter, or combiner.

9 Claims, 10 Drawing Sheets

$t = (1/2) \lambda/(n-1)$

FIG. 4

$t = (m+1/2) \lambda/(n-1)$

MULTIPLE-WAVELENGTH OPTICAL TRANSCEIVER

TECHNICAL FIELD OF THE INVENTION

This invention relates to optical transceivers and, more particularly, to a multiple-wavelength optical transceiver and a packaging arrangement therefore.

BACKGROUND OF THE INVENTION

The goal in local fiber access is to provide high bandwidth two-way communications to the home. Any practical local fiber access network requires a transceiver which is compact, rugged and, most of all, cheap. One network transmission design uses a high-bandwidth analog broadcast optical signal at 1.5 $\mu$m, with two way time-multiplexed communications using a 1.3 $\mu$m optical signal carried on the same fiber.

Figure 1:
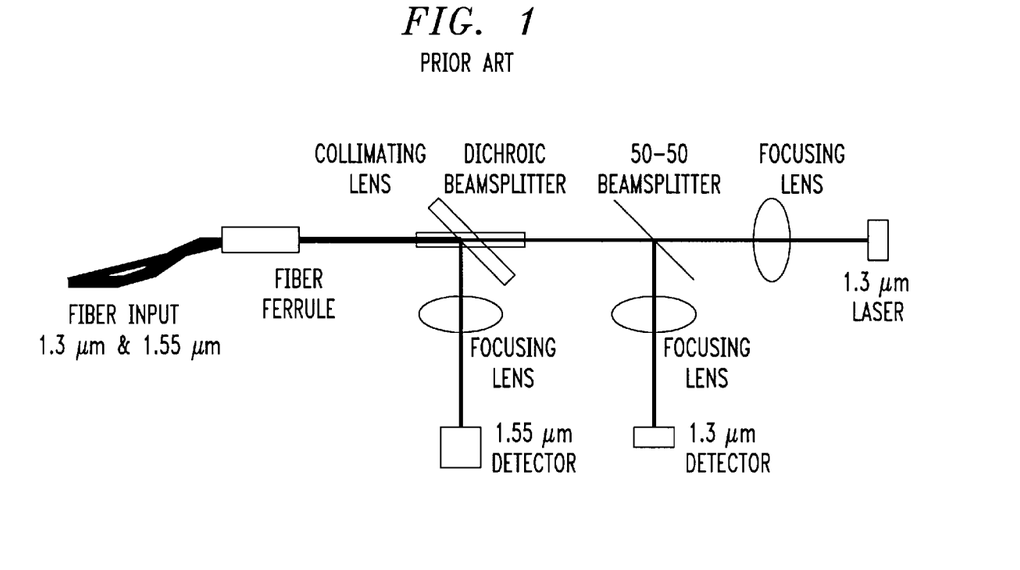
FIG. 1 shows an illustrative block diagram of a prior art bulk optic transceiver for providing bidirectional communications.

At first glance, fiber optic systems which use free space propagation and bulk optical components seem to be obsolete. They could be replaced by integrated optic arrangements which eliminate the large number of expensive alignments. Yet bulk optic arrangements are often still the most cost-effective approach. The basic idea of this standard approach is shown in FIG. 1.

As shown, the 1.3 $\mu$m and 1.55 $\mu$m optical signals are received over a fiber which terminates in a fiber ferrule. The received optical signals are collimated and then split into the 1.3 $\mu$m and 1.55 $\mu$m signals by a dichroic beamsplitter. The 1.55 $\mu$m signal is then focused and detected. The 1.3 $\mu$m signal is further split in a beamsplitter and the reflected portion focused and detected. The transmission path through the beamsplitter is focused and coupled to a 1.3 $\mu$m laser.

While the bulk optic bidirectional transceiver has worked well, there has been continuing attempts to improve the assembly, alignment, compactness, ruggedness and cost of such transceivers.

SUMMARY OF THE INVENTION

In accordance with the present invention, we have combined the simplicity of bulk optic components with the integration of guided wave optics into a compact optical transceiver design. Our multi-wavelength optical transceiver package is simple and compact, and needs only a single lateral alignment to align multiple optical signals transmitted into and received from an optical fiber to opto-electronic devices of the transceiver.

In one embodiment the present invention is an optical demultiplexing apparatus capable of spatially separating a multiplexed optical signal into two or more optical wavelength signals thereof. An input multiplexed optical signal present on a first plane to a second plane is imaged through a color-selective grating, wherein the color-selective grating has a nonlinear change of diffraction characteristics as a function of incident wavelength to provide substantial spatial separation in the second plane between bands of wavelengths proximate to the two or more optical wavelength signals.

According to another embodiment, an optical demultiplexing apparatus is capable of spatially separating a polarization-multiplexed optical signal into the two optical polarization signals thereof. The polarization-selective grating has a different diffraction characteristic for each of the two orthogonal polarizations to provide substantial spatial separation for the two orthogonal polarizations in the second plane.

In yet another embodiment, an optical multiplexing apparatus is capable of combining two or more optical wavelengths present at two or more distinct locations on a first plane into a multiplexed optical signal at a second plane using a color-selective grating. The color-selective grating has a nonlinear change of diffraction characteristics as a function of incident wavelength to provide substantial spatial combination for bands of wavelengths proximate to the two or more optical wavelengths.

According to yet another embodiment, an optical multiplexing apparatus is capable of combining two orthogonally polarized signals present at two or more distinct locations on a first plane into a polarization-multiplexed optical signal at a second plane using a polarization-selective grating. The polarization-selective grating has a different diffraction characteristic for each of the two orthogonal polarizations to provide substantial spatial combination for the two orthogonal polarization signals in the second plane.

In other embodiments, the present invention may be implemented as an optical combiner, an optical splitter, and various optical transceiver connectors.

DETAILED DESCRIPTION

In the following description, each item or block of each figure has a reference designation associated therewith, the first number of which refers to the figure in which that item is first located (e.g., 210 is located in FIG. 2).

Before we discuss specific embodiments, the present invention is generally directed to optical demultiplexing apparatus capable of spatially separating a multiplexed optical signal into two or more optical wavelength signals thereof. An input multiplexed optical signal present on a first plane is imaged through a color-selective grating to a second plane. The color-selective grating has a nonlinear change of diffraction characteristics as a function of incident wavelength to provide substantial spatial separation in the second plane between bands of wavelengths proximate to the two or more optical wavelength signals. In another demultiplexing embodiment, the apparatus may use a polarization-selective grating to spatially separate a polarization-multiplexed optical signal into two substantial spatially separated optical polarization signals. In other embodiments, the optical apparatus may be used as an optical signal multiplexer, splitter, or combiner. Operation of these different apparatuses is best understood with reference to specific implementations described in the following paragraphs.

Figure 2A:
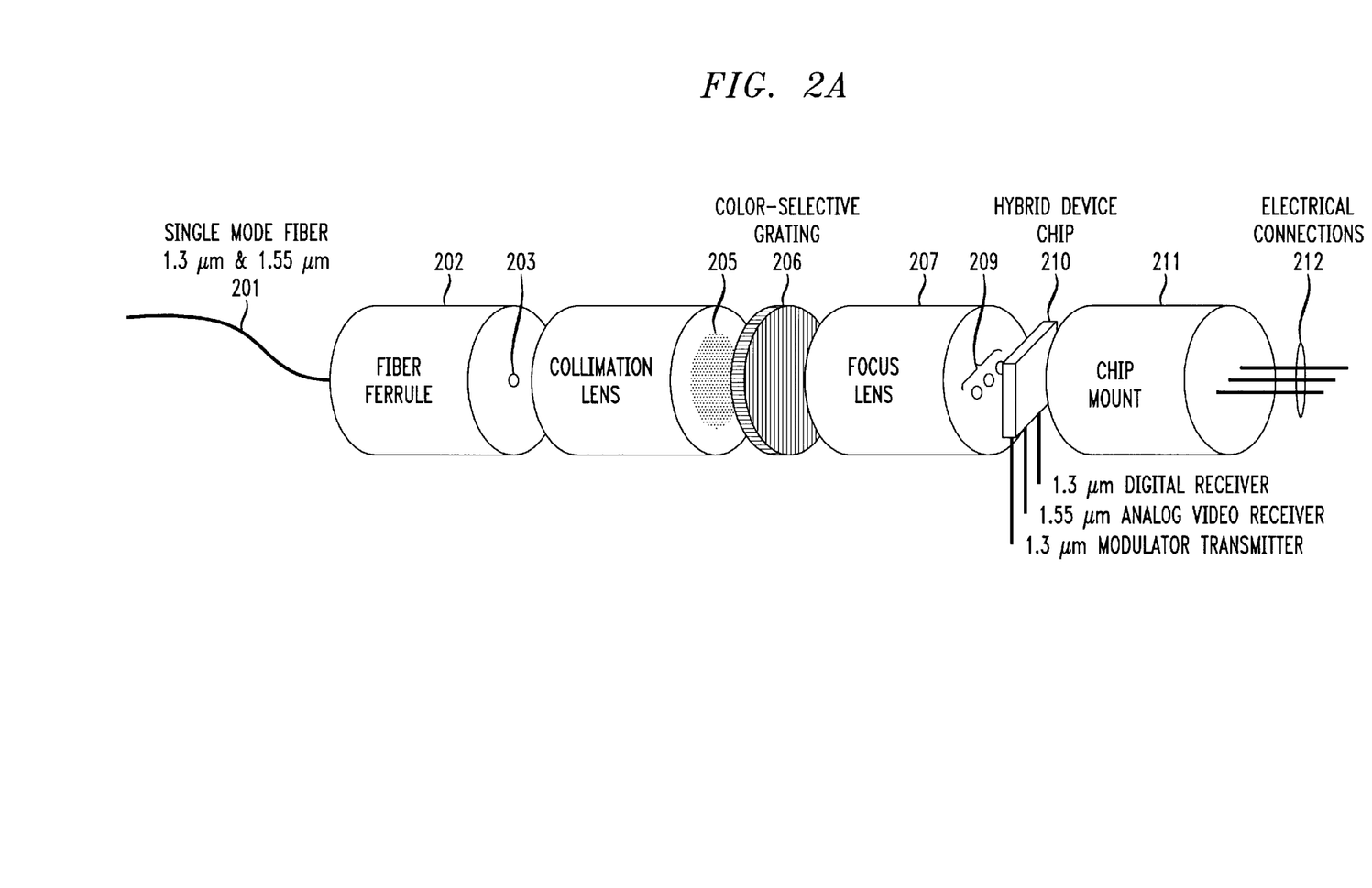
FIG. 2a shows an illustrative diagram of a transceiver in accordance with the present invention and FIG. 2b shows the resulting diffraction patterns for illustrative 1.3 and 1.55 $\mu$m optical signals passing through the color-selective grating used in the transceiver of FIG. 2a, FIG. 3 shows the phase delay in a normal (single order) binary phase grating.
Figure 2B:
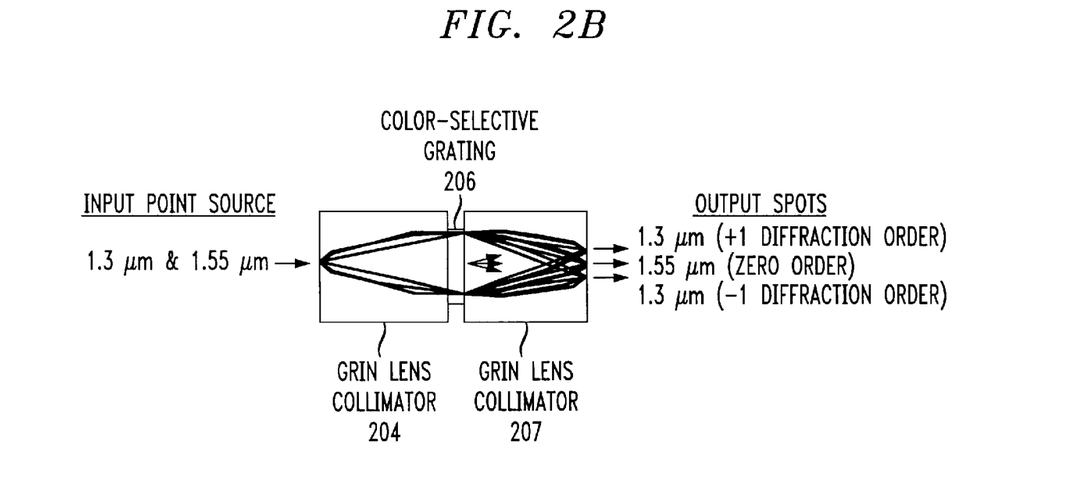

Shown in FIG. 2a is an illustrative diagram of a 2-wavelength demultiplexing transceiver for imaging an input multiplexed optical signal present on a first plane through a color-selective grating to a second plane. FIG. 2b shows a longitudinal bisection view of the resulting diffracted beam paths for illustrative 1.3 and 1.55 $\mu$m optical signals passing through the color-selective grating used in the transceiver of FIG. 2a. As will be discussed our 2-wavelength fiber transceiver of FIG. 2a is simple and compact, and needs only a single lateral alignment for all three devices: the 1.3 um detector, 1.3 um transmitter, and 1.5 um detector or receiver. All other alignments are lithographically controlled.

As shown, the 1.3 $\mu$m and 1.55 $\mu$m optical signals are received over an optical fiber 201 which terminates in a fiber ferrule 202. The optical signals outputted from the end 203 of fiber 201 are collimated by a GRIN lens collimator 204, to, form the plane wave, shown by 205.

Our design relies on a color-selective grating 206 to split the 1.3 $\mu$m and 1.55 $\mu$m signals. Normally, when a planar grating is illuminated by an optical signal other than the design wavelength it will still diffract. The angle of diffraction and the efficiency both change slightly. For the wavelengths of interest in telecommunications, 1.3 and 1.55 $\mu$m, the sine of the diffraction angle changes linearly with wavelength, and the diffraction efficiency is nearly constant. For example with reference to FIG. 3, a binary phase grating designed for 1.3 $\mu$m to produce a 10° deflection will have a diffraction efficiency of 40.5% in the +1 and −1 orders. The same grating, illuminated with 1.55 $\mu$m light (about 20% change in wavelength), will diffract the beam by 12° with an efficiency of about 37%.

Figure 3:
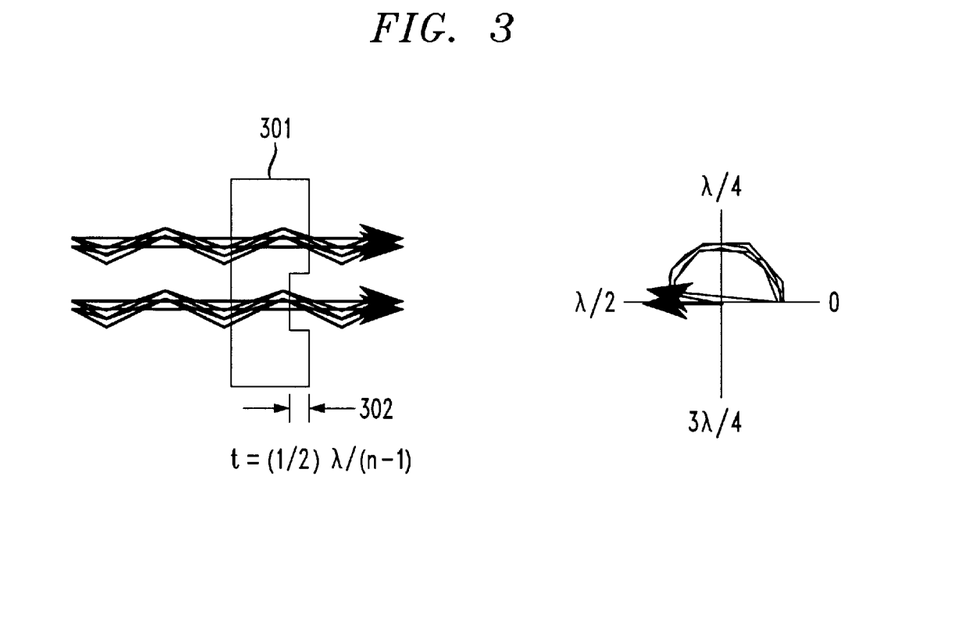
Figure 4:
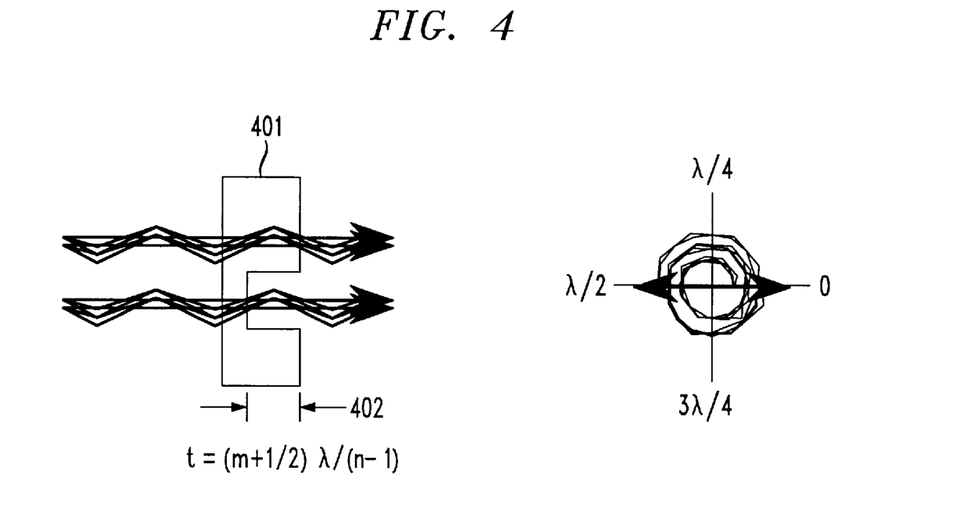
FIG. 4 shows the phase delay in a multiple order binary phase grating used in FIG. 2a, FIG. 5a shows the optical signal separation for a three-wavelength optical transceiver arrangement.

With continued reference to FIG. 3, there is shown a normal binary phase grating 301 illuminated by the design wavelength $\lambda$ and a longer wavelength $\lambda'$. For normal dispersion, $n'(\lambda')<n(\lambda)$. So when the etch depth 302 is chosen to satisfy $(n-1)=\lambda/2$, at $\lambda'$ $t(n'-1)<\lambda'/2$ and the longer wavelength is delayed slightly less than $\lambda/2$. In FIG. 4, a multiple order grating 401 shows the effect of a multiple-order etch depth 402. If the etch depth 402 is increased by an integer number of full waves of delay, it will satisfy $t=(m+\frac{1}{2})\lambda/(n-1)$, where m is an integer. There is approximately no effect on the design wavelength—the diffraction efficiency in the +1st and −1st orders is still 40.5%, the efficiency in the first order is still theoretically zero.

However, if the dispersion and m are appropriate, the phase delay at $\lambda'$ can approximately satisfy a zero net phase delay, as shown at the right of FIG. 4. For an on-axis wavefront, this element is effectively invisible at $\lambda'$, with almost no diffraction. If this element is illuminated at an angle, of course, the effective phase delay changes, and the diffraction efficiencies will change dramatically.

Therefore, for on-axis plane waves of the two design wavelengths this optical element is color-selective. It will split one color into two equal intensity beams in the +1 and −1 order angles, and leave the other design color undeflected.

This approach is not limited to a simple grating pattern. Any binary phase pattern, including computer-generated holograms and phase kinoforms, can be fabricated. This design can, with some difficulty, be extended to an arbitrary number of phase levels by finding the appropriate etch depths and a material with the right dispersion.

It is also possible to modify the hologram design to obtain greater functionality using, for example, two separate substrates of different materials etched with unique patterns and then joined face-to-face. With such an approach, it is possible to apply independent holographic patterns to two colors so that both colors are diffracted into the desired distributions. It is also possible to use the multiple substrate approach to operate on more than two wavelengths. For example, it is possible to use two substrates to diffract color 1 at one angle, diffract color two at a different angle, and transmit color 3.

The package shown in FIG. 2A is designed to separate input and output signals based on their color. However, the same design can be applied to separate input and output signals based on their input polarization using polarization selective holograms. For example, polarization-selective computer generated holograms capable of diffracting only one of two orthogonal input polarizations have been demonstrated using a single deeply etched substrate as has been described in the article "Single-substrate birefringent computer generated holograms" by F. Xu, R-C. Tyan, Y. Fainman and J. E. Ford, Optics letters 21,516–518, 1996 and incorporated by reference herein. Polarization selective computer generated holograms capable of diffracting both of two orthogonal input polarizations have been demonstrated using two etched birefringent substrates as has been described in the article "Polarization-selective computer generated holograms" J. Ford, F. Xu, K. Urquhart and Y. Fainman, Optics Letters 18(6) 456–458, 1993 and incorporated by reference herein In one embodiment, color-selective grating 206 is made using the substrate material BK7, which has an appropriate index and dispersion for a grating which diffracts 1.55 $\mu$m and transmits 1.3 $\mu$m. Such a color-selective grating 206 suitable for use in our transceiver design of FIG. 2a is further described in the article "Wavelength-selective planar holograms" by J. E. Ford, F. Xu and Y. Fainman, Optics Letters 21,80–82 1996 and incorporated by reference herein.

For most applications, this type of color-selective grating element 206 would be less useful than the more conventional methods of separating color: a dichroic mirror or simple spectrometer grating. This is because of the excessive diffraction loss and limited wavelength separation capability offered by this type of grating. However, in accordance with the present invention, we have recognized that the limited wavelength separation of such a color-selective grating 206 may be adapted to be compatible with the spacing of devices formed in an integrated electronics package of a multi-wavelength transceiver package.

Returning to FIG. 2a, we describe the application of color-selective grating 206 in a transceiver designed to work with two wavelengths, 1.3 $\mu$m and 1.55 $\mu$m. First, for Wave Division Multiplex (WDM) applications, the spectrum is confined to within a few percent of the center (normally, 1.5 $\mu$m to 1.56 $\mu$m). Second, the input is received over a fiber 201, which is effectively a point source 203 for both wavelengths. The angular spectrum is also small, and the grating 206 can be illuminated by an on-axis plane wave, e.g., 205, formed using, for example, a GRIN (gradient index) lens collimator 204.

The collimated wavefronts illuminate the color selective grating 206, which is designed to deflect 1.3 $\mu$m light and be invisible to 1.55 $\mu$m light. The second GRIN lens 207 focuses the diffracted beams onto a plane 208 near the back surface of the lens. At this plane 208, there are three spots 209: 1.3 $\mu$m light (~40% intensity), 1.55 $\mu$m light (~full intensity), and 1.3 $\mu$m light (~40% intensity). The separation between the spots depends on the spatial period of the grating 206 and the focal length of the lens 207.

The beam deflection angle in air, q, is determined from $\Lambda g = \lambda/2 \sin q$, where $\Lambda g$ is the grating period. Then the separation of the spots, w, is determined by the lens 207 focal length, f, by $w = f \tan q$. For example, a grating period of 40 $\mu$m and a 6 mm focal length lens will yield a beam angle of about 1° and a spot separation of about 100 $\mu$m. The grating period can be much less, depending on etching techniques, but probably can not be much shorter than a 1-to-1 etch depth to period ratio.

As previously noted, the grating 206 may be a computer generated hologram. If aberration correction is necessary, for example to correct for Petzval curvature, then it is easy to use an appropriate binary phase pattern. The alignment tolerances of the grating is determined by the curvature of the desired phase profile. For minor aberration corrections, this profile is smooth over hundreds of microns, making the grating easy to position.

The optics presents three spots 209 on a line at the rear surface 208 of the lens 207, with an accurately specified separation of 10–300 $\mu$m between them. The three spots 209 are each respectively aligned with opto-electronic devices consisting, illustratively, of a digital receiver at 1.3 $\mu$m, an analog receiver at 1.55 $\mu$m, and a transmitter (modulator or source) at 1.3 $\mu$m. The opto-electronic devices are part of an electronics package including an integrated chip or a hybrid device chip 210 and chip mount 211. This integrated/hybrid chip is fixed to a chip mount 211 which provides electrical connections 212 to the transceiver package electronics. The advantage of using an integrated electronics package is the relative ease of alignment and packaging, while the hybrid electronics package might be much more practical to fabricate.

Figure 14:
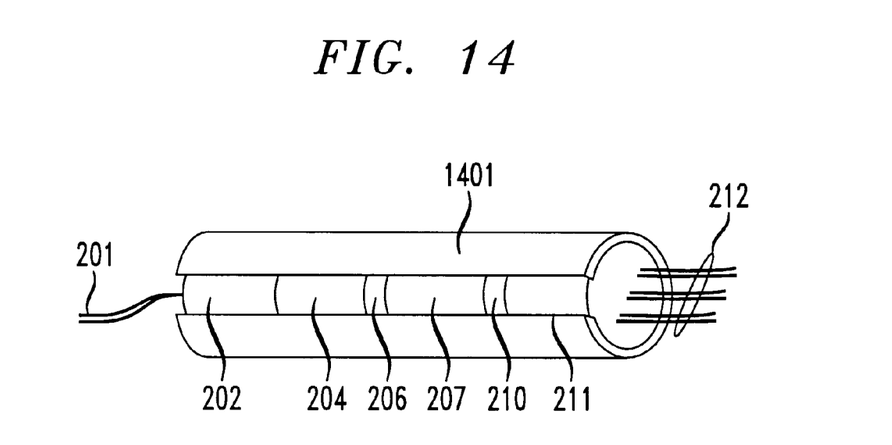

The transceiver package of FIG. 2a, thus contains the following components; 1) the input fiber 201, held in a ceramic ferrule 202, 2) the collimating lens 204, 3) the grating 206, and 4) the electronics package 210, 211. The only alignment necessary is that of aligning the electronics package to the three spots 209. In addition to the standard x-y lateral alignment, the electronics package must also be rotationally aligned to the grating to ensure low loss coupling alignment to the three spots. In one illustrative arrangement, all of the optics are held in alignment using a cylindrical ceramic sleeve as shown in FIG. 14.

Crosstalk reduction is another important issue. The hologram of the grating 206 should provide a contrast between wavelengths of up to 100:1. More than that is not practical, and the actual results might be as low as 10:1. The necessary low crosstalk may be accomplished by including a color filter in line with each path to absorb or reflect the undesired light. Additionally, it would be possible to apply a patterned multilayer coating to the back of the second lens 207. However, to avoid an extra alignment, it would be preferable to put such coatings directly on the electronic devices on chip 210.

For laser sources, as opposed to modulators, one type of crosstalk which can not be avoided is the illumination of the 1.3 $\mu$m source with 1.3 $\mu$m input signal. The wavelengths can be slightly different, but must be within a couple nanometers to stay in the communications band. Ideally, the crosstalk could be used to injection lock the laser to the desired frequency.

Figure 5A:
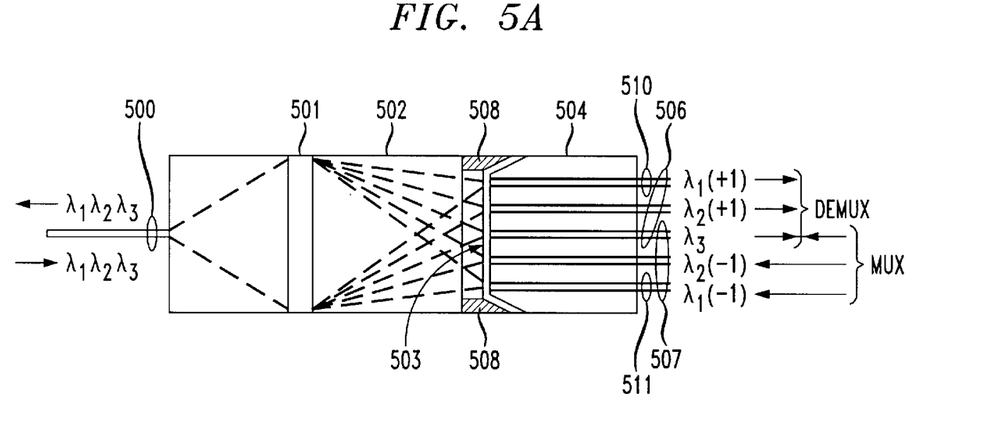

Shown in FIG. 5a is the optical signal separation for an illustrative three-wavelength optical transceiver arrangement. In this embodiment, a received three wavelength signal $\lambda 1$, $\lambda 2$, and $\lambda 3$ is collimated onto grating 501 which separates the three wavelengths. The focusing collimating lens 502 presents five spots in-line on its end surface 503 representing, from top to bottom, the separated wavelengths $\lambda 1$ (+1 diffraction order), $\lambda 2$ (+1 diffraction order), $\lambda 3$, $\lambda 2$ (−1 diffraction order), and $\lambda 1$ (−1 diffraction order).

Figure 5B:
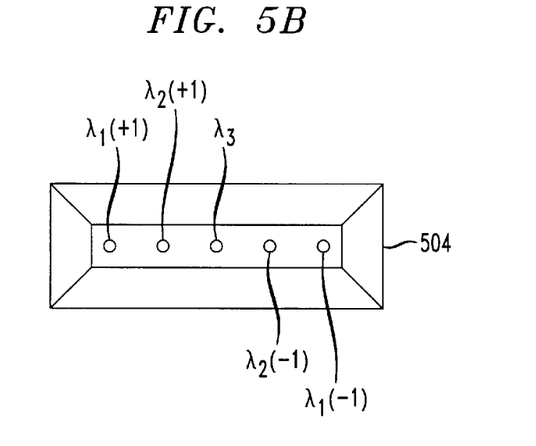
FIG. 5b shows a truncated pyramidal optical fiber mount for the arrangement of FIG. 5a, and FIG. 5c shows the optical spot pattern for another three-wavelength arrangement.

As shown, a cylindrical alignment part 508 (which is optional) in contact with the lens 502 has a recess shaped like a truncated pyramid to receive a matching truncated pyramidal shaped optical fiber mount 504 shown in FIG. 5b. In our illustrative arrangement, the optical fiber mount 504 accommodates five optical fibers. It should be noted that the mount 504 could also be arranged to house a variety of optical and/or opto-electronic devices which may couple to the spots formed by focusing collimating lens 502 (in the same manner as described in subsequent FIGS. 6–11).

The arrangement shown in FIG. 5a can be utilized as an optical demultiplexer whereby the signals $\lambda 1$, $\lambda 2$, and $\lambda 3$ received over fiber 500 are demultiplexed onto the separate fibers 506.

The arrangement shown in FIG. 5a can also be utilized as an optical multiplexer. In such an arrangement optical signals $\lambda 1$, $\lambda 2$, and $\lambda 3$ received over fibers 507 are multiplexed onto the fiber 500. It should be noted that the arrangement of FIG. 5a can function concurrently as both a multiplexer and a de multiplexer.

A subset of the arrangement shown in FIG. 5a can also be utilized as an optical combiner. In such an arrangement optical signals, for example, $\lambda 1$ (+1) and $\lambda 1$ (−1) received over fibers 510 and 511, respectively, are combined into a $\lambda 1$ signal for output over the fiber 500. It should be noted that a subset of the arrangement of FIG. 5a can also function as a splitter. In such an arrangement optical signal, for example, a $\lambda 1$ signal on the fiber 500 is split into $\lambda 1$ (+1) and $\lambda 1$ (−1) components and outputted over fibers 510 and 511, respectively.

The grating 501 utilized for the three-wavelength separator arrangement of FIG. 5a requires a more complex hologram design and structure, such as two etched substrates joined face-to-face, or a spatially patterned dielectric multilayer.

Figure 5C:
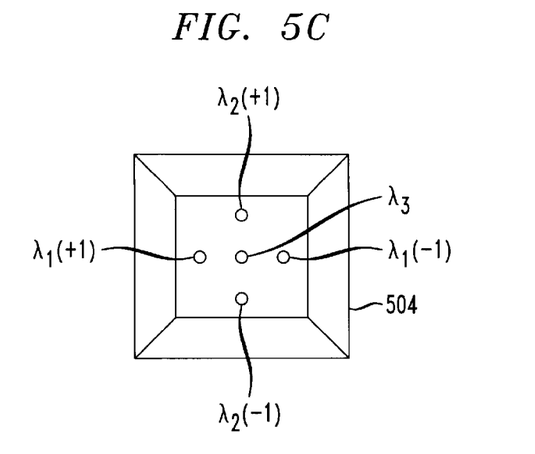

The grating 501 can also be selected to perform a three wavelength separation which results in a five spot "cross" pattern (three vertical and three horizontal spots with a shared center spot), as shown in FIG. 5c. Such a cross spot pattern would require a the two grating patterns to be designed with a 90 degree angle. Note, the position of the spot is determined by the grating angle and frequency—any pattern is equally easy to obtain.

Figure 6:
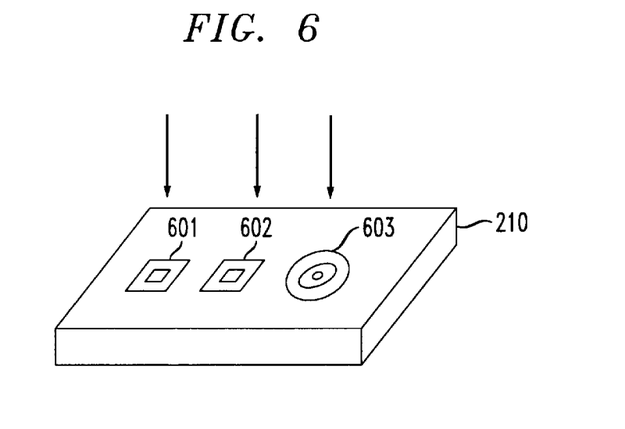
FIG. 6 shows an illustrative CMOS chip including integrated surface-normal devices including a VCSEL device for use in the chip mount of FIG. 2a, FIG. 7. shows an illustrative CMOS chip including integrated surface-normal devices including a modulator device for use in the chip mount of FIG. 2a, FIG. 8 shows illustrative hybrid packaged devices for surface-normal coupling to a fiber fixed to the chip mount of FIG. 2a, FIG. 9 shows an illustrative CMOS chip including integrated edge-coupled devices for use in the chip mount of FIG. 2a, FIG. 10 shows illustrative hybrid packaged devices including a fiber coupling arrangement for use in the chip mount of FIG. 2a, FIG. 11 shows an illustrative CMOS chip including integrated edge-coupled devices and an edge mounted fiber for use in the chip mount of FIG. 2a, FIG. 12 shows an illustrative sleeve packaging arrangement for the transceiver of FIG. 2a, FIG. 13 shows the self alignment of an etched CMOS chip with the focusing lens of the transceiver of FIG. 2a, FIG. 14 shows the self alignment of a molded chip mount with the focusing lens of the transceiver of FIG. 2a, FIG. 15 shows an illustrative sleeve packaging arrangement including mechanical laser alignment.
Figure 7:
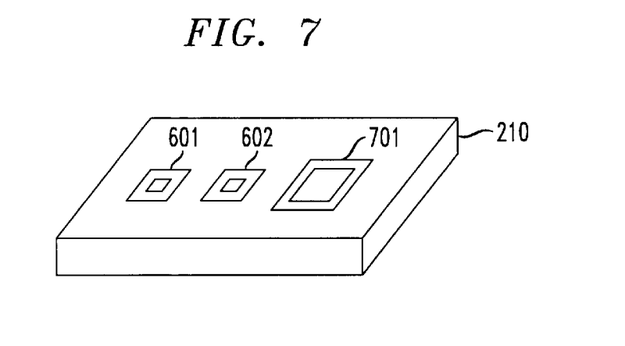

While the optical transceiver may more generally be arranged into a variety of multi-wavelength configurations, the remainder of the description is directed to the most practical two-wavelength configuration. Electronic Packages Integrated Surface-Normal Devices The preferred option for optical alignment and mechanical mounting is to have a single surface-normal Complementary Metal Oxide Semiconductor (CMOS) chip, as shown in FIGS. 6 and 7. This chip would combine two surface-normal detectors 601, 602 with either a VCSEL (vertical cavity surface-emitting laser) 603 (FIG. 6) or a surface-normal modulator 701 (FIG. 7). Since the detectors 601 and 602 can be made oversized, it is easier to accurately align these detectors to their respective optical spots (e.g., 209 of FIG. 2a). The detectors 601 and 602 may also be covered with multilayer dielectric mirrors to reflect the crosstalk wavelength. Such an arrangement also enables hybrid CMOS/SEED device integration on a single substrate.

As will be discussed in detail in a later paragraph, when the optical transceiver module incorporates an active laser source, the coupling of this laser to the output fiber is the determining factor for the package alignment accuracy. However, when the data transmitter is an optical modulator, such as 701 of FIG. 7, which varies the light reflected from the modulator surface, the alignment requirements are more relaxed.

Figure 8:
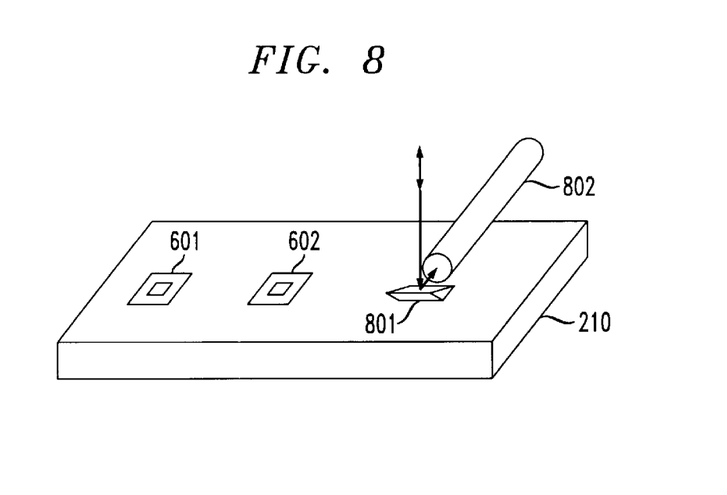

Shown in FIG. 8 is a chip which combines two surface-normal detectors 601 and 602 and a 45 degree mirror 801 to provide surface-normal coupling to/from optical fiber 802.

Integrated Edge-Emitting Devices

Figure 9:
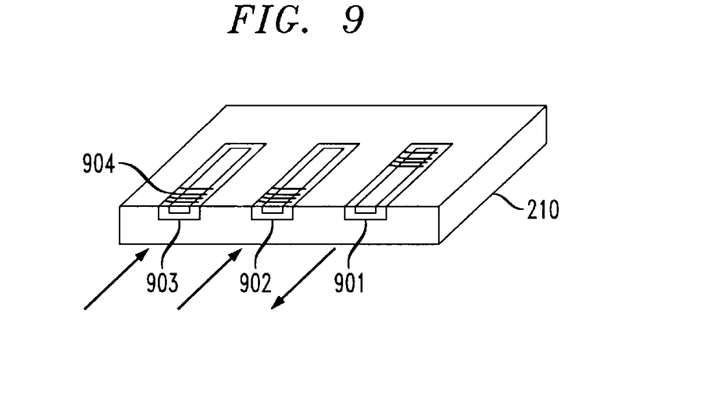

Shown in FIG. 9 is an integrated edge-emitting device mounted so as to align with the three spots 209 of FIG. 2b. An edge emitting laser 901 operates at 1.3 $\mu$m. The edge-coupled 1.3 $\mu$m detector 902 and 1.55 $\mu$m detector 903 are also integrated into the single-chip device. The horizontal bars 904 drawn indicate Bragg reflectors. They are used as the back mirror of the DBR laser 901, and as input filters for the two detectors 902 and 903.

The concerns in this embodiment is the optical coupling into the detectors 902 and 903. The photons can be absorbed in a fairly thick region beneath the detector, or they can be coupled into a planar waveguide. For the waveguide, the Bragg mirror can provide crosstalk reduction, but the coupling efficiency and alignment tolerance will be critical. For the absorption region, applying an effective filter coating may be needed.

Hybrid Device Packages

Figure 10:
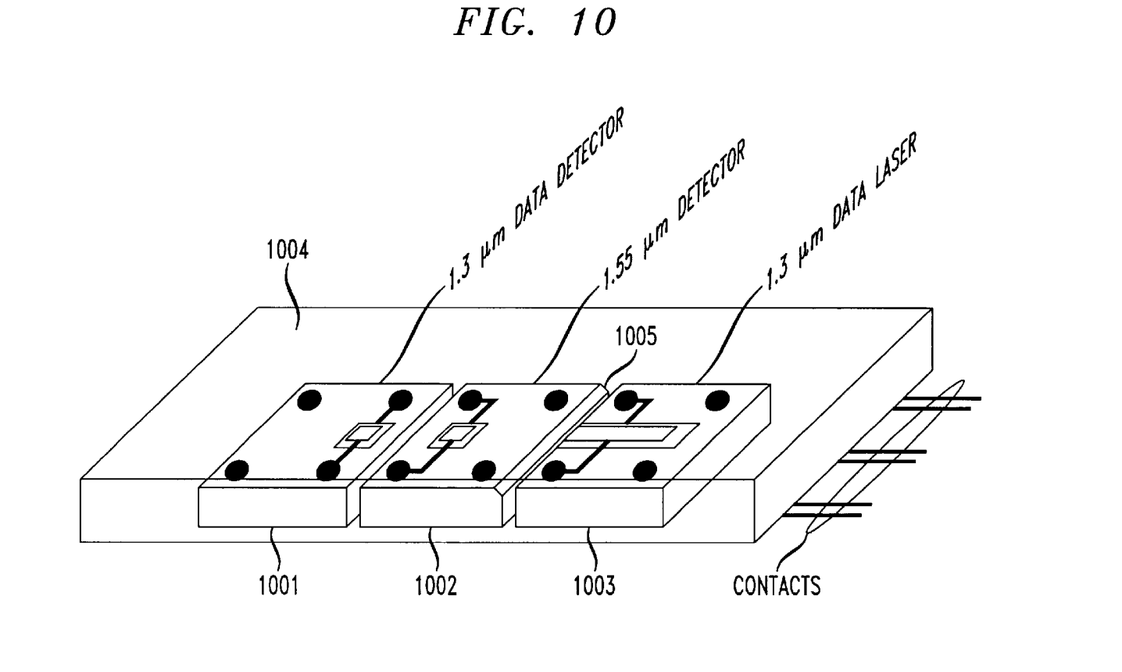

FIG. 10 shows an illustrative hybrid packaged arrangement for use in the chip mount of FIG. 2a. The fabrication problems involved with an integrated circuit solution can be avoided by such a hybrid approach. Each device 1001–1003 may then be made using the most suitable fabrication technology. The devices 1001–1003 are then mounted to contacts on an integration substrate 1004 to form a single electronic package using flip-chip bonding or epitaxial lift-off.

The devices 1001–1003 are connected to the integration substrate 1004 individually using solder bumps 1006 which provide electrical and mechanical contacts. In the configuration shown, the light output of an edge emitting laser 1003 is reflected from a 45° corner 1005 of the adjacent chip 1002 to a surface normal direction.

Figure 11:
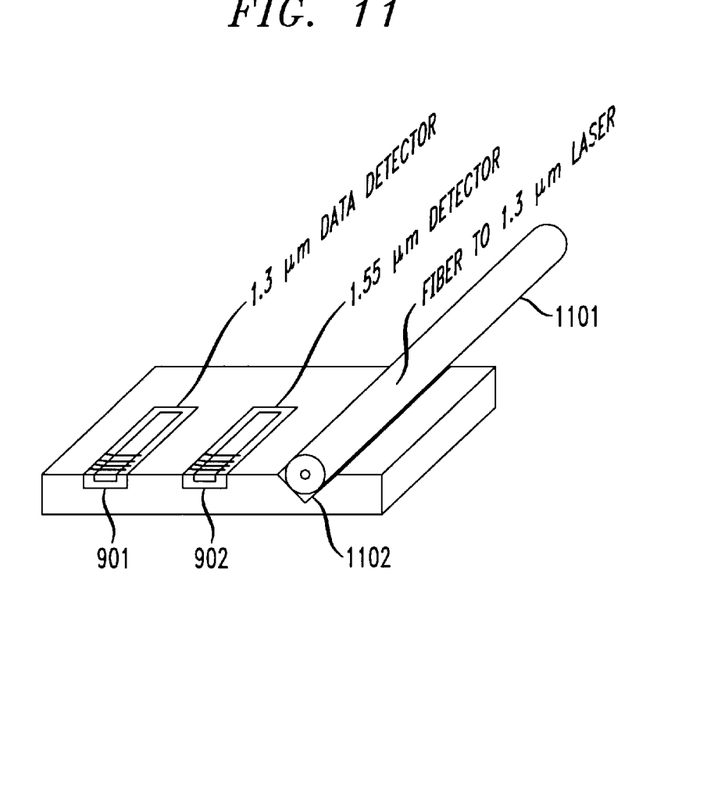

FIG. 11 shows another type of hybrid package which may be used for fiber coupling. It shows how an output fiber 1101 might be held in the appropriate location by a silicon V-groove 1102. While some of the simplicity of the alignment may be lost, because the external devices must be fiber coupled. However, this approach allows complete flexibility in connecting remote devices, and even distant modules.

Transceiver Package

Figure 12:
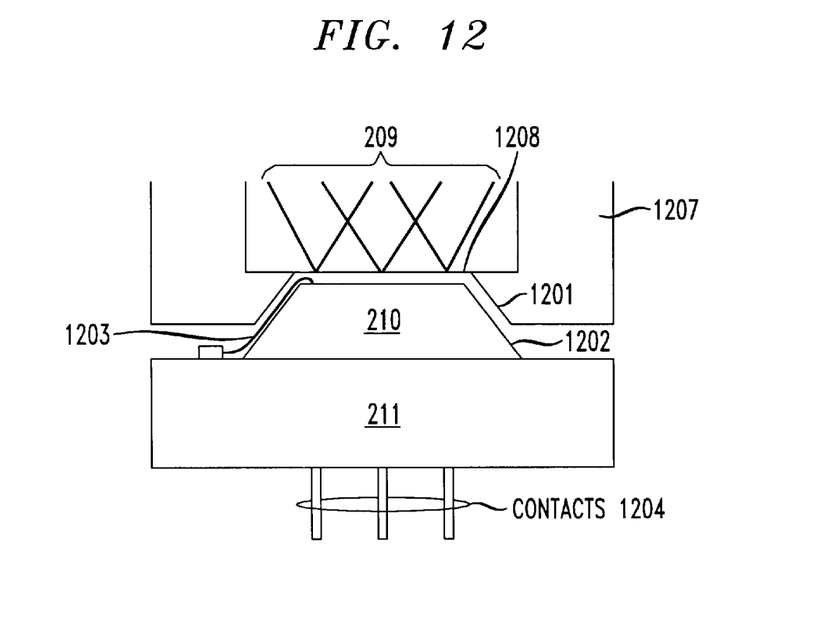

Shown in FIG. 12 is an illustrative passive alignment technique which may be utilized in a transceiver package to align the lens 207 with the chip 210. As shown, the end surface 208 of lens 207 fits into a cylindrical alignment piece 1207, designed so that the three optical spots lie on end surface 1208 (co-located with surface 208 of lens 207). The cylindrical alignment piece 1207 on end surface 208, has a recessed truncated pyramidal notch 1201 etched or formed therein. This notch has been formed to match with the crystallographic truncated pyramidal etching 1202 of the sides of chip 210 (e.g., silicon or GaA). This alignment technique is same as the alignment technique previously described for units 508 and 504 of FIG. 5a. The mating truncated pyramidal shapes of surface 1201 and 1202 of the chip 210 provides an automatic alignment capability when the cylindrical alignment piece 1207 and plastic mount 211 units are brought into contact with each other.

The chip 210 may be bonded or epoxied to the plastic mount 211. It should be noted that the wire bond leads 1203 to the chip 210 are arranged to fit into a recessed area etched into the pyramidal notch 1201. The wire bonds provide electrical connection between devices on chip 210 and contacts 1204 to the transceiver package. Since the pyramidal etching of the chip 210 and alignment piece 1207 can be made very precise relative to each other, good lateral and rotational alignment is achieved between the optical spots on end surface 1208 and the electronic devices of chip 210. Alignments within a tolerance of 5 $\mu$m may be achieved. Lateral alignment is critical to ensure that good coupling exists between the spots and the devices of chip 210. Axial alignment is less critical between the spots and the devices of chip 210.

Figure 13:
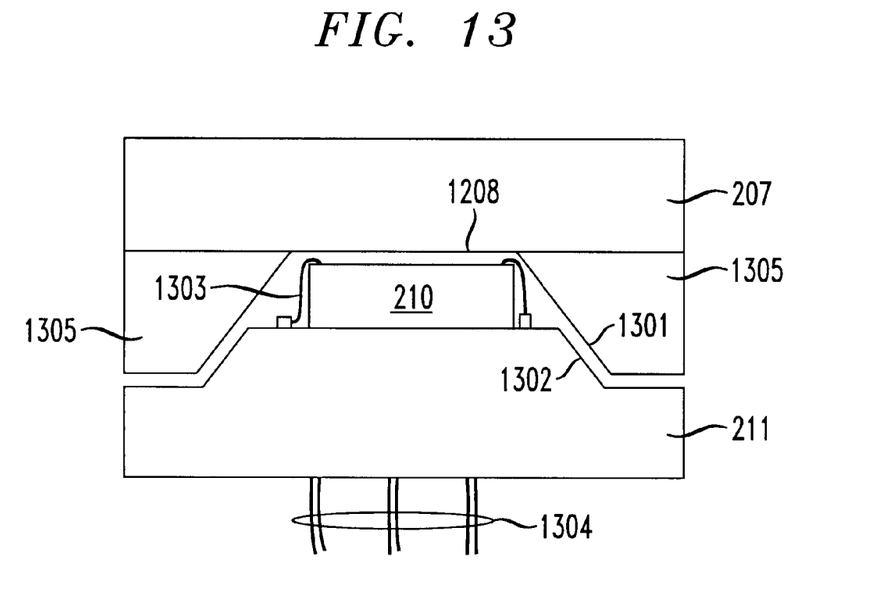

Shown in FIG. 13 is another illustrative passive alignment technique which may be utilized to align the lens 207 with the chip 210. As shown, the end surface 1208, which contains the multiple optical spots, may abut an optional alignment piece 1305 which has a larger recessed pyramidal notch etched 1301 therein. This notch 1301 has been etched to match with the pyramidal shape 1302 of the sides of the plastic mount 211. The pyramidal shape 1302 may be formed by molding, grinding or etching of the plastic mount 211. In this arrangement, the chip 210 once mounted on the top of the plastic mount 211, plays no active role in the alignment of the optical spots on the surface of 208 with the electronic devices on the surface of chip 210. While this technique provides sufficient alignment accuracy, achieving a tolerance of 5 $\mu$m may be more difficult to accomplish. Again the wire bond leads 1303 which connect the chip 210 to contacts 1304 are arranged to fit into the spacing between the mating pyramidal notch 1301 of alignment piece 1307 and the pyramidal form 302 of mount 211.

FIG. 14 shows an illustrative slotted sleeve 1401 packaging arrangement for the transceiver of FIG. 2a. The chip 210 mounted onto the plastic mount 211 is first placed into the slotted sleeve 1401. Thereafter the lens 207, grating 206, lens 204 an ferrule 202 are slid into the slotted sleeve 1401. The sleeve acts to provide lateral alignment between ferrule 202, lens 207, lens 204 and mount 211. Note that the rotational alignment between the lens 207, grating 206, lens 204 and ferrule 202 is unimportant. The rotational alignment between the grating 206 and the chip 210 can be provided by 1) forming an appropriate tab on the side of mount 211 and grating 206 (not shown) or 2) the mating of pyramidal surfaces of the lens 207 with the mount 211, as previously discussed in FIGS. 12 and 13.

Figure 15:
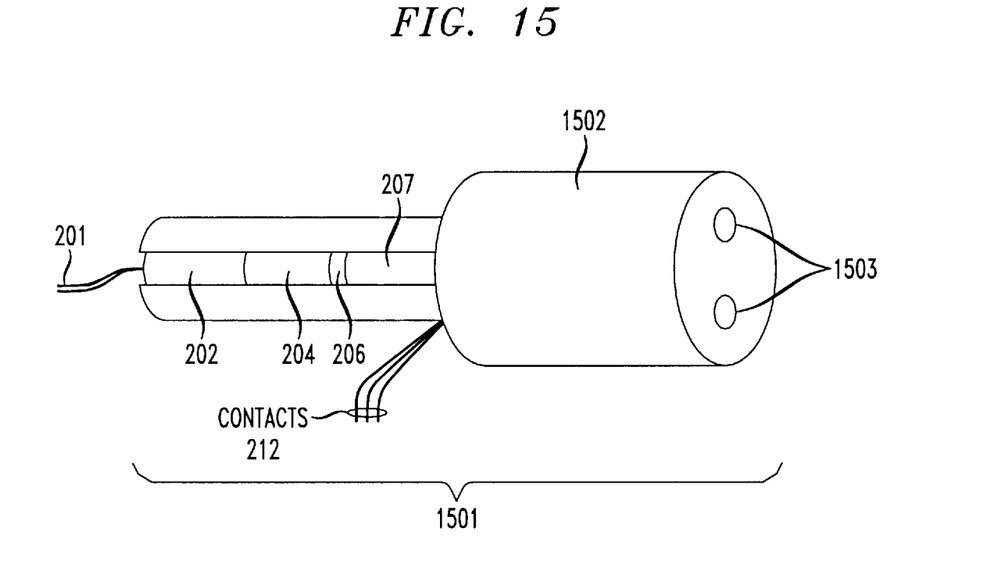

FIG. 15 shows another illustrative sleeve packaging arrangement 1501 for the optical transceiver of FIG. 2a, including a well known active mechanical laser alignment mechanism 1502. Such an active alignment mechanism enables a user to adjust controls 1503 on the mechanism 1502 to permit very precise alignment of the optics with the electronics package (210 and 211). Such an alignment is most critical when the optical transceiver includes a laser for providing the 1.3 $\mu$m signal source (e.g., see 503 of FIG. 5). Since the laser is a very small device, it is much more difficult to accurately align so that its output is coupled efficiently into fiber 201. Illustratively, a Sentech Systems Inc. 5-axis diode laser alignment package may be adapted for aligning the laser source with the optics of the optical transceiver. Thus, when the optical transceiver module incorporates an active laser source, the coupling of this laser to the fiber 201 is the determining factor for the package alignment accuracy.

However, when the data transmitter is an optical modulator ( e.g., see 701 of FIG. 7), which varies the light reflected from the modulator surface, the alignment requirements are more relaxed. The active area of a surface-normal modulator 701 can be made much larger than the optical spot size. For example, a 100×100 $\mu$m active area quantum well modulator is much larger than the 10 $\mu$m diameter active area in a 1.55 $\mu$m single mode fiber, yet is small enough that it can be modulated at over 1 GHz. In such an arrangement, the input light spot is imaged onto the modulator device plane is modulated and reflected automatically back onto the spot. The alignment accuracy is an order of magnitude less than that normally required for single mode coupling. This means that the package can be fabricated and assembled with extremely low cost.

An illustrative multiple quantum well modulators suitable for this application is described in the article of J. Cunningham, R. Pathak, J. Ford, W. Jan, A. Kastalsky "Reflectivity from Multiple Quantum Well Modulators with Contrast Ratio of 22:1 at 1.55 Microns", SPIE (Society of photo-optical Instrumentation Engineers) proceedings, Vol. 2891, page 67, 1996. This modulator is capable of GHz modulation. The MARS (mechanical antireflection switch) modulator is a lower speed (4 MHz) higher contrast (20 dB) and potentially less expensive alternative (K. W. Goossen, J. A. Walker and S. C. Arney, Silicon modulator based on mechanically-active anti-reflection layer with 1 Mbit/s capability for fiber in the loop applications," IEEE Photonics Letters vol. 6, pp. 1420–1423, June 1994, which is incorporated by reference herein) with detectors operating at 1.3 and 1.55 $\mu$m, making an all-in-one opto-electronic package.

Figure 16:
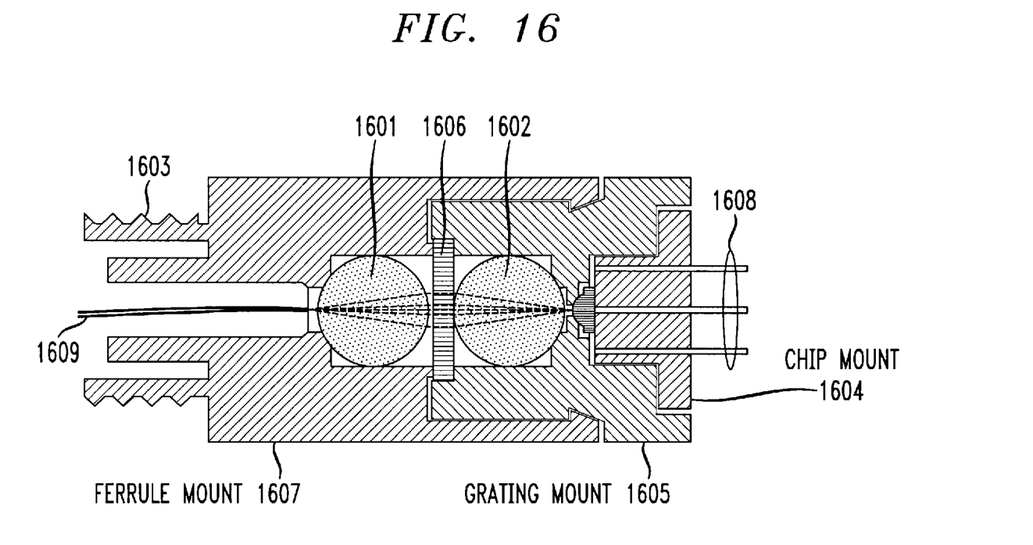
FIG. 16 shows a ball lens package including an FC connector, which is illustrative of any of a variety of connectors.
Figure 17:
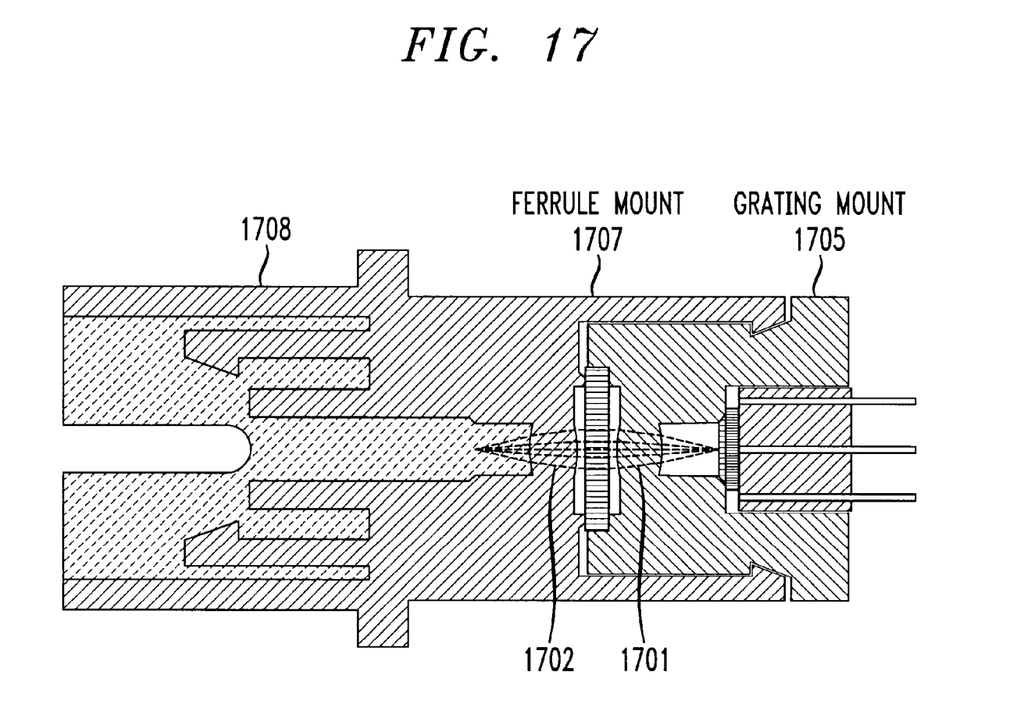
FIG. 17 shows a plastic aspere lens package including an SC connector, which is illustrative of any of a variety of connectors.

FIGS. 16 and 17 each show the design of a simple, compact and very inexpensive two-wavelength transceiver module. These designs show how the GRIN lens 204 and 207 shown in FIG. 2a can be substituted for using less expensive ball and plastic lens alternatives while maintaining acceptable performance. The plastic packages can also incorporate GRIN lenses. Both modules are designed to accept standard FC or SC input couplers. FIG. 16 shows a transceiver module design having a FC-coupled input adaptor 1603 and using press-fit ball lenses 1601 and 1602. As shown, the chip is wire bonded to chip mount 1604 and fits into a recessed opening of grating mount 1605. The ball lens 1602 is then press-fitted into the grating mount 1605. The grating 1606 fits into a recess in grating mount 1605 and then snapped into the mating ferrule mount 1607. The ball lens 1601 has previously been snapped into the ferrule mount 1607. The fiber 1609 is part of a connector which mates to the FC connector 1603. After assembly, the light signal from the fiber 1609 is collimated in ball lens 1601 and coupled to the grating 1606. The separated light signals are then focused by ball lens 1602 onto the electronic devices on the chip of chip mount 1604. The electrical signals to/from the chip are connected via the terminals 1608. The illustrative transceiver module may be constructed to be about one inch in length.

FIG. 17 shows how injection-molded plastic aspheric lenses 1701 and 1702, which replace the ball lens 1601 and 1602 of FIG. 16, can be molded as part of the mechanical structure of the ferrule 1707 and grating 1705 mounts, further reducing cost and complexity. This arrangement also shows the use of an inexpensive plastic SC coupler 1708 molded into the ferrule mount 1707.

The devices described for use herein may be fabricated in CMOS or by using any other of the well known techniques. The laser devices can, illustratively, be formed using MBE deposition of InGaAs/InP multilayer quantum wells.

What has been described is merely illustrative of the application of the principles of the present invention. Other arrangements and methods can be implemented by those skilled in the art without departing from the spirit and scope of the present invention.

We claim:

1. An optical apparatus comprising:

means for imaging an input optical signal present on a first plane to a second plane through a grating, wherein said grating causes the input optical signal to be separated into two or more optical wavelength signals each located at a distinct position in the second plane and wherein the optical apparatus is arranged as a transceiver package comprising an electronics package including one or more optical detectors and one or more reflective modulators located at the second plane for interfacing to at least one of the optical wavelength signals and wherein the transceiver package is self-aligning using complementary shapes at the interface between the means for imaging and the electronics package.

2. The optical apparatus of claim 1 wherein the one or more optical detectors are implemented on an surface-normal integrated chip for interfacing to at least one of the optical wavelength signals.

3. The optical apparatus of claim 1 further comprising a slotted sleeve housing for holding in optical alignment 1) a ferrule for holding an optical fiber carrying the input optical signal;

2) a lens for receiving the input optical signal and imaging it onto the first surface of said grating;

3) said grating separating the input optical signal into two or more optical wavelength signals; and 4) said electronics package including the one or more optical detectors and one or more reflective modulators for interfacing to the separate signals.

4. The optical apparatus of claim 3 wherein the transceiver package further comprises
a second lens for coupling the two or more optical wavelength signals received from the second surface of the grating to the one or more optical detectors and one or more reflective modulators.

5. The optical apparatus of claim 1 further comprising
1) a ferrule mount including
a connector end for mating to an optical connector and
a lens for receiving the input optical signal from an optical fiber of said optical connector and illuminating a grating;
2) said grating affixed between said ferrule mount and a second mount, said grating separating the input optical signal into two or more optical wavelength signals;
3) said second mount including
second lens for receiving the separated signals from said grating and focusing them onto a termination mount; and
4) said termination mount holding the one or more optical detectors and one or more reflective modulators for receiving the separated signals from the second lens.

6. The optical apparatus of claim 5 wherein said grating is affixed in said second mount.

7. The optical apparatus of claim 5 wherein the connector of said ferrule mount is a connector selected from a group of connectors including at least: a standard FC, SC, LC, and ST type connectors.

8. The optical apparatus of claim 5 wherein the lens and the second lens are selected from a lens group including at least: ball lenses, gradient index lenses, and molded plastic or glass lenses.

9. The optical apparatus of claim wherein the lens and the second lens are plastic spheric or aspheric lenses molded therein.

* * * * *